United States Patent [19]
Chu et al.

[11] Patent Number: 5,874,166
[45] Date of Patent: Feb. 23, 1999

[54] TREATED CARBON FIBERS WITH IMPROVED PERFORMANCE FOR ELECTROCHEMICAL AND CHEMICAL APPLICATIONS

[75] Inventors: Xi Chu, Albany; Kimio Kinoshita, Cupertino, both of Calif.

[73] Assignee: Regents of the University of California, Oakland, Calif.

[21] Appl. No.: 708,151

[22] Filed: Aug. 22, 1996

[51] Int. Cl.⁶ .................................................. H01M 4/58
[52] U.S. Cl. .................... 428/368; 423/447.2; 429/218
[58] Field of Search .............................. 423/448, 447.2; 428/367, 368; 429/218

[56] References Cited

U.S. PATENT DOCUMENTS

| | | | |
|---|---|---|---|
| 4,562,511 | 12/1985 | Nishino et al. | 361/324 |
| 4,702,977 | 10/1987 | Hiratsuka et al. | 429/194 |
| 4,980,250 | 12/1990 | Takahashi et al. | 429/194 |
| 5,271,917 | 12/1993 | Hoffman | 423/447.6 |
| 5,292,408 | 3/1994 | Tanigawa et al. | 423/447.8 |
| 5,310,553 | 5/1994 | Simon et al. | 429/212 |
| 5,472,742 | 12/1995 | Lee | 427/399 |

OTHER PUBLICATIONS

Chu, X., et al., "Catalyzed Carbon Gasification Studied by Scanning Tunneling Microscopy and Atomic Force Microscopy", *Journal of Catalysis*, vol. 140, 1993, pp. 543–556. No month.

Kanno, R., et al., "Carbon Fiber as a Negative Electrode in Lithium Secondary Cells", *J. Electrochem. Soc.*, vol. 139, No. 12, Dec. 1992, pp. 3397–3404.

Takami, Norio, et al., "Rechargeable Lithium–Ion Cells Using Graphitized Mesophase–Pitch–Based Carbon Fiber Anodes", *J. Electrochem. Soc.*, vol. 142, No. 8, Aug. 1995, pp. 2564–2571.

Zaghib, Karim, et al., "Optimization of Electrochemical Properties of Graphite Whisker for Use as Negative Electrode in Lithium Ion Rechargeable Batteries by Control of Whisker Dimensions", *The Electrochemical Society Proceedings*, vol. 94–28, pp. 121–135. No date.

*Primary Examiner*—Michael Lewis
*Assistant Examiner*—Stuart L. Hendrickson
*Attorney, Agent, or Firm*—John P. Taylor; Paul R. Martin

[57] ABSTRACT

A treated mesophase carbon fiber is disclosed having a high density of exposed edges on the fiber surface, and a method of making such a treated fiber. A carbon electrode is also described which is constructed from such treated mesophase carbon fibers. The resulting electrode, formed from such treated flexible carbon fibers, is characterized by a high density of active sites formed from such exposed edges, low corrosion, and good mechanical strength, and may be fabricated into various shapes. The treated mesophase carbon fibers of the invention are formed by first loading the surface of the mesophase carbon fiber with catalytic metal particles to form catalytic etch sites on a hard carbon shell of the fiber. The carbon fiber is then subject to an etch step wherein portions of the hard carbon shell or skin are selectively removed adjacent the catalytic metal particles adhering to the carbon shell. This exposes the underlying radial edges of the graphite-like layers within the carbon shell of the mesophase carbon fiber, which exposed radial edges then act as active sites of a carbon electrode subsequently formed from the treated mesophase carbon fibers.

11 Claims, 7 Drawing Sheets

```
┌─────────────────────────────────┐
│   FORMING CATALYST ETCH SITES ON │
│     THE HARD CARBON SHELL OF     │
│     A MESOPHASE CARBON FIBER     │
└─────────────────────────────────┘
                 │
┌─────────────────────────────────┐
│ SELECTIVELY ETCHING THE HARD CARBON│
│ SHELL OF THE FIBER ADJACENT THE   │
│ CATALYST ETCH SITES TO EXPOSE     │
│ EDGES OF THE GRAPHITE-LIKE PLANES │
│ BENEATH THE HARD CARBON SHELL     │
└─────────────────────────────────┘
                 │
┌─────────────────────────────────┐
│ FORMING A CARBON ELECTRODE FROM TWO│
│ OR MORE OF THE ETCHED MESOPHASE   │
│ CARBON FIBERS, WITH A PLURALITY OF│
│ ACTIVE SITES FORMED ON THE EXPOSED│
│ EDGES OF THE GRAPHITE-LIKE PLATES │
│ OF THE TREATED CARBON FIBERS      │
└─────────────────────────────────┘
```

TREATED CARBON FIBERS WITH IMPROVED PERFORMANCE FOR ELECTROCHEMICAL AND CHEMICAL APPLICATIONS

The invention described herein arose in the course of, or under, Contract No. DE-AC03-SF00098 between the United States Department of Energy and the University of California for the operation of the Ernest Orlando Lawrence Berkeley National Laboratory. The Government may have rights to the invention.

BACKGROUND OF THE INVENTION

1. Field of the Invention

This invention relates to improved treated carbon fibers, electrodes formed from such treated carbon fibers, and a process for making such treated carbon fibers. More particularly, this invention relates to mesophase carbon fibers treated to increase the density of exposed edges thereon, electrodes formed from such treated mesophase carbon fibers characterized by an increased density of active sites formed from such exposed edges, and a process for treating mesophase carbon fibers to increase the density of active sites on electrodes formed from such treated fibers.

2. Description of the Related Art

Graphitized carbon has been used in the formation of electrodes and catalysts for many electrochemical and chemical applications. In general, however, only the edge sites of the graphite structure function as active sites responsible for the desired chemical or electrochemical reactions, with the basal plane of the graphite structure remaining relatively inert in the reaction environment. It is, therefore, desirable to increase the edge site density of graphite materials to achieve high performance. However, for most graphitized materials, the percentage of the edge sites to basal plane sites in graphitized carbon is limited due to the nature of the graphite structure and material processing.

In practical applications, carbon electrodes are usually formed from graphite powders which are either pressed into a shaped electrode or coated on a current collector with a binder. The carbon electrode structure formed by pressing the graphite powders has a very low density of active or edge sites, while the carbon electrode structure formed using a current collector and a binder adds weight and cost to the system.

Carbon fibers have also been used in the construction of carbon electrode structures. Such carbon fibers have higher conductivity than corresponding carbon powder structures, making them a superior choice in some electrochemical applications. Furthermore, such carbon fibers exhibit high mechanical strength and superior flexibility which enable them to be fabricated into various shapes and forms to fit a particular application.

Nishino et al. U.S. Pat. No. 4,562,511 describes the use of carbon fibers as an electrode in the formation of a capacitor; while Takahashi et al. U.S. Pat. No. 4,980,250 and Kano et al., in "Carbon Fiber as a Negative Electrode in Lithium Secondary Cells", J. Electrochemical Soc., Vol. 139, No. 12 (December 1992) at pages 3397–3404 both describe the use of PAN based carbon fibers in the formation of a composite electrode for a lithium secondary cell at low current density. The use of chopped vapor-grown carbon whiskers as a negative electrode in a lithium battery is discussed by Zaghib et al. in "Optimization of Electrochemical Properties of Graphite Whisker for Use as Negative Electrode in Lithium Ion Rechargeable Batteries by Control of Whisker Dimensions", The Electrochemical Society Proceedings Volume 94–28, at pages 121–135.

While the use of carbon fibers in the formation of carbon electrodes has its advantages, many conventional carbon fibers have an onion-like structure with edge sites only exposed at the ends of the individual fibers, i.e., resulting in a low density of active sites on such fibers.

Recently, a new type of carbon fiber, know as a mesophase carbon fiber, has become available commercially. In a mesophase carbon fiber, the graphite-like single layer atomic sheets are arranged radially around the axis of the fiber, i.e., to radiate from the axis to the surface of the fiber. The surface of the fiber is then coated with a layer of hard carbon which encapsulates or covers the edges of such radial sheets. FIGS. 1A–1D illustrate such fibers, which are generally indicated, respectively at arrows $2a$–$2d$, with lines $10a$, $10b$, $10c$, and $10d$ respectively showing the radial disposition of the interfaces between the graphite-like sheets comprising the fiber, resulting in the formation of radial edges $12a$–$12d$ in the respective fibers. Such fibers, as available commercially, are almost inert for chemical reactions, except at the end edges of the individual fibers, because the radial edges $12a$–$12d$ referred to above are formed with a hard carbon outer layer or coating, as shown at 20 (in an exaggerated scale for illustrative purposes only) in FIGS. 1A–1D. Hard carbon shell 20 covers or sheaths the respective radial edges $12a$–$12d$ so that such covered edges cannot function as active sites in an electrode formed using such fibers.

This hard shell on the mesophase fiber is apparently formed during the spinning of the fiber. When the fiber is spun through the spinnerette, the surface of the fiber is subject to a large shear stress because it is in direct contact with the extruder and moving at a very high speed, resulting in the formation of an amorphous structure. After carbonization and graphitization, this skin becomes a continuous dense amorphous carbon layer with a low density of edge sites, similar to glassy carbon or the basal plane of graphite. Such mesophase carbon fibers conventionally find application in the construction of composite materials because of their excellent mechanical properties.

Because of the dense amorphous nature of the hard shell on the mesophase fiber, early tests on the use of such fibers in the construction of electrodes for rechargeable cells indicated that the rate of charging and discharging was very low, i.e., rendering the long continuous mesophase fibers not useful in that form. However, it was found that such mesophase fibers could be useful if they were ground up into small segments having a length of from about 30 to 50 micrometers ($\mu$m). In essence, the chopped or ground fibers were then treated as regular carbon powder, requiring the use of conventional binders and current collectors to function as an electrode. Norio Takami et al., in "Rechargeable Lithium-Ion Cells Using Graphitized Mesophase-Pitch-Based Carbon Fiber Anode", J. Electrochemical Soc. 142 (1995) at page 2564, describes such uses of ground mesophase fibers in the formation of carbon electrodes for rechargeable cells.

It would be desirable if a carbon fiber could be developed which would have a high density of exposed edges and which would exhibit low corrosion, yet have the mechanical strength and flexibility of conventional carbon fibers which would permit fabrication of carbon electrodes therefrom in various shapes and characterized by a high density of active sites formed from such exposed edges.

SUMMARY OF THE INVENTION

In accordance with the invention a mesophase carbon fiber is processed to provide a high density of exposed edges on the fiber surface, and a carbon electrode is constructed from such treated mesophase carbon fibers. The resulting electrode, formed from such treated flexible carbon fibers, is characterized by a high density of active sites formed from such exposed edges, low corrosion, and good mechanical strength, and may be fabricated into various shapes. The treated mesophase carbon fibers of the invention are formed by first loading the surface of the mesophase carbon fiber with catalyst particles to form catalytic etch sites on a hard carbon shell of the fiber. The carbon fiber is then subject to an etch step wherein portions of the hard carbon shell or skin are selectively removed adjacent the catalyst particles adhering to the carbon shell. This exposes the underlying radial edges of the graphite-like layers within the carbon shell of the mesophase carbon fiber, which exposed radial edges then act as active sites of a carbon electrode subsequently formed from the treated mesophase carbon fibers.

DETAILED DESCRIPTION OF THE INVENTION

The invention comprises novel mesophase carbon fibers which have been treated to provide a high density of exposed edges on the surface thereof, a new carbon electrode formed from such treated fibers, and a process for treating such mesophase carbon fibers to form the high density of exposed edges thereon. The resulting carbon electrode is characterized by a high density of active sites formed from such exposed edges, low corrosion, and good mechanical strength. Since the electrode is formed from flexible carbon fibers, fabrication of the carbon electrode into various shapes is possible. The novel treated mesophase carbon fiber from which the carbon electrode of the invention is fabricated, is formed by first loading the hard carbon shell or surface of the carbon fiber with catalyst particles. The mesophase carbon fiber is then subject to an etching process wherein portions of the hard carbon shell or skin are selectively removed adjacent the catalyst particles adhering to the carbon shell. This exposes radial edges of the graphite-like layers within the carbon shell of the mesophase carbon fiber which then function as active sites for the carbon electrode subsequently formed from the treated mesophase carbon fibers.

a. Definitions

By use of the term "mesophase carbon fiber" herein is meant a carbon fiber having graphite-like planes therein with edges of such planes generally perpendicular to the side surface of the fiber and a hard side surface coating of carbon formed over such edges, as generally shown in FIGS. 1A–1D and FIG. 2.

By use of the term "hard carbon shell" herein is meant a continuous dense amorphous carbon layer without edge sites on the surface of the mesophase carbon fiber.

By use of the term "high density of active sites" herein is meant a density of at least 1,000 active sites per $cm^2$ of surface area of the fiber.

By use of the term "low corrosion" herein is meant that under normal electrochemical operation the individual fibers do not undergo sufficient chemical attack to cause an individual fiber to lose its properties By use of the term "good mechanical strength" herein is meant that the fibers can be fabricated into free-standing electrodes which are capable of withstanding the normal mechanical stress encountered by an electrode during normal electrochemical operations.

b. The Mesophase Carbon Fibers

Mesophase carbon fibers having graphite-like planes therein radiating from the axis of the fiber, with edges of such planes terminating generally perpendicular to the side surface of the fiber, and a hard side surface coating of carbon formed over such edges, are commercially available from Amoco Performance Products, Inc. under the trademarks P25, P55, P75, P100, P120, and P130, as well as Thermograph EWC-400X(02D), and Thermograph EWC-600X (01C). Such mesophase carbon fibers are also available from the DuPont Chemical Company under the trademarks E-01, E-35, E-55, E-75, E-105, E-120, and E-130. Mesophase carbon fibers are also available from Nippon Graphite Fiber Corporation under the trademark GRANOC. Some of the foregoing mesophase fibers have lower crystallinity than others. Mesophase fibers with higher crystallinity and radially oriented graphite planes are preferred. By use of the term "higher crystallinity" is meant that the arrangement of the graphite-like atomic planes has a d(002) spacing <3.42Å and a $L_c$>100Å, where the d(002) spacing is the distance between the atomic planes and $L_c$ is the size of the crystallite in the direction perpendicular to the layer planes.

The commercially available mesophase carbon fibers useful in the practice of the invention usually range from about 1.0 micrometer ($\mu$m) in diameter to about 50 $\mu$m in diameter. However, thin foils with a width of 50 millimeters (mm) or more have been prepared using similar techniques and this type of foil is also useful in the practice of the invention because also has a radially oriented microstructure as in the mesophase carbon fibers. The hard carbon shell around the graphite-like planes within the fiber usually ranges from about 0.01 $\mu$m (10 nm) in thickness to about 0.1 $\mu$m in thickness.

c. Treatment of Mesophase Fibers to Form Catalyst Sites

To form the desired catalyst sites on the hard carbon surface of the mesophase carbon fibers, in accordance with the process of the invention, the surface of the mesophase fiber is first exposed to a metal or metal-containing catalyst which will facilitate the subsequent etching of the hard carbon surface of the mesophase fiber, as will be described below. Any technique that can bring these catalysts onto the surface of the carbon fibers to be treated may be used, including regular solution dip coating, vacuum deposition, chemical vapor deposition (CVD), plasma enhanced deposition (PED), sputtering, etc.

In a preferred embodiment, such catalyst loading of the fiber surface will comprise contacting the surface of the mesophase fiber with an aqueous solution or dispersion of the metal-containing catalyst, either dissolved in a suitable solvent or dispersed in an appropriate liquid dispersant. However, it is also within the scope of the invention to load the surface of the fibers with catalyst particles using any of the above-described means to load the surface of the mesophase carbon fibers with the metal or metal-containing catalysts.

Any metal or metal-containing compound capable of functioning as a catalyst for the etching of carbon may be used to treat the surface of the mesophase fiber, including transition metals, alkali metals, alkaline earth metals, platinum metals, and even rare earth metals, as well as alloys and compounds of such metals, e.g., oxides, hydroxides, salts (inorganic and organic), and organometallic compounds.

Examples of metal-containing catalysts which may be useful in the formation of metal catalyst sites on the hard carbon surface of the mesophase fiber to facilitate subsequent etching of the fiber thus include transition metals such as titanium, vanadium, chromium, manganese, iron, cobalt, nickel, copper, zinc, and gallium; alkali metals such as lithium, sodium, potassium, rubidium, and cesium; alkaline earth metals such as beryllium, magnesium, calcium, strontium, barium, and radium; the platinum metals (platinum, palladium, ruthenium, rhodium, osmium, and iridium), rare earth metals such as lanthanum, cerium, praseodymium, neodymium, promethium, samarium, europium, gadolinium, terbium, dysprosium, holmium, erbium, thulium, ytterbium, and lutetium. Alloys, oxides, and salts of such metals, alkali metal and alkaline earth metal hydroxides, and mixtures of any of the above may also be used.

The concentration of the catalyst in the treatment media will vary with the particular catalyst as well as the contact time between the media containing the catalyst and the mesophase fiber. The amount (percentage of surface area) of the hard carbon shell to be removed will also be affected by the concentration or density of the catalyst sites formed on the surface of the carbon coating on the mesophase fiber.

When, for example, a mesophase fiber was treated with a 1 molar aqueous solution of nickel acetate, the contact time required between the fiber and the catalyst-containing solution was just long enough to wet the fiber, after which the treated fiber was removed from the liquid and dried. For other solutions or catalyst-containing mixtures, the relationships between catalyst concentration and contact time, may be empirically determined, depending upon the amount (area) of hard carbon shell to be removed in the subsequent etching step.

Figure 1A:
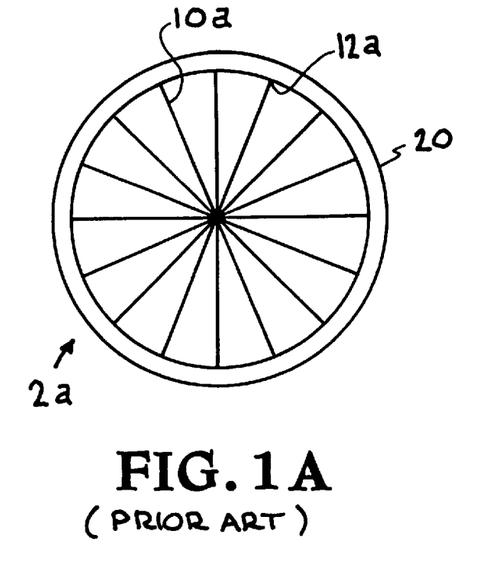
FIGS. 1A–1D are cross-sectional views of various prior art mesophase carbon fibers, showing the disposition of the graphite-like sheets of carbon within the hard carbon shell.
Figure 1B:
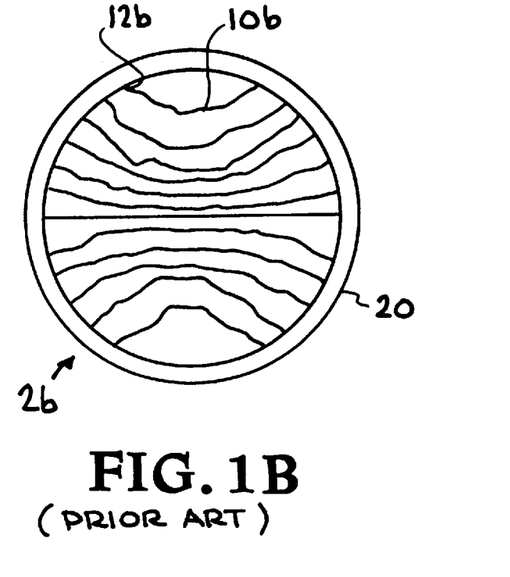
Figure 1C:
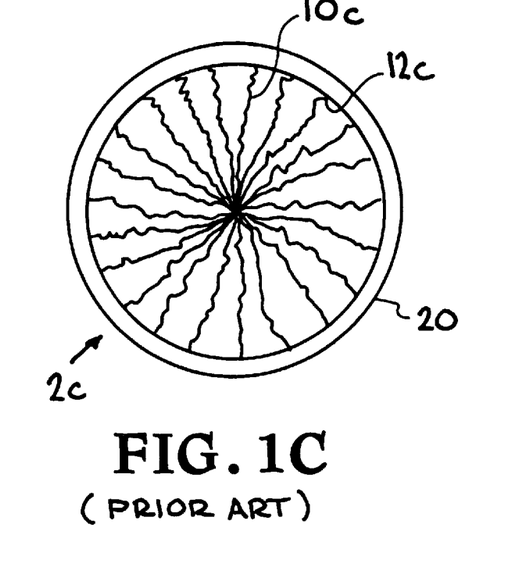
Figure 1D:
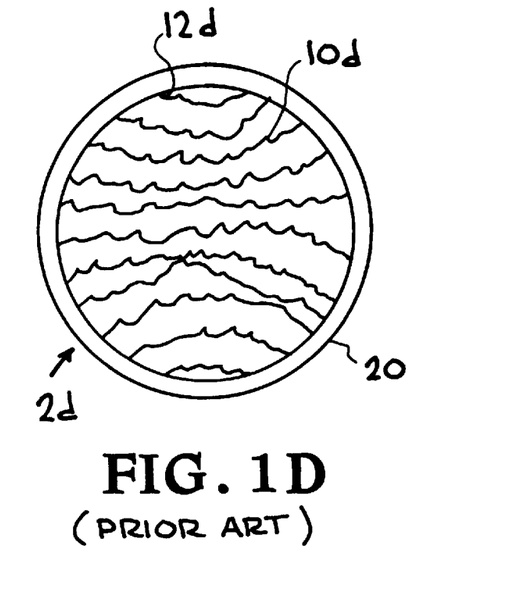
Figures 2, 3, 4:
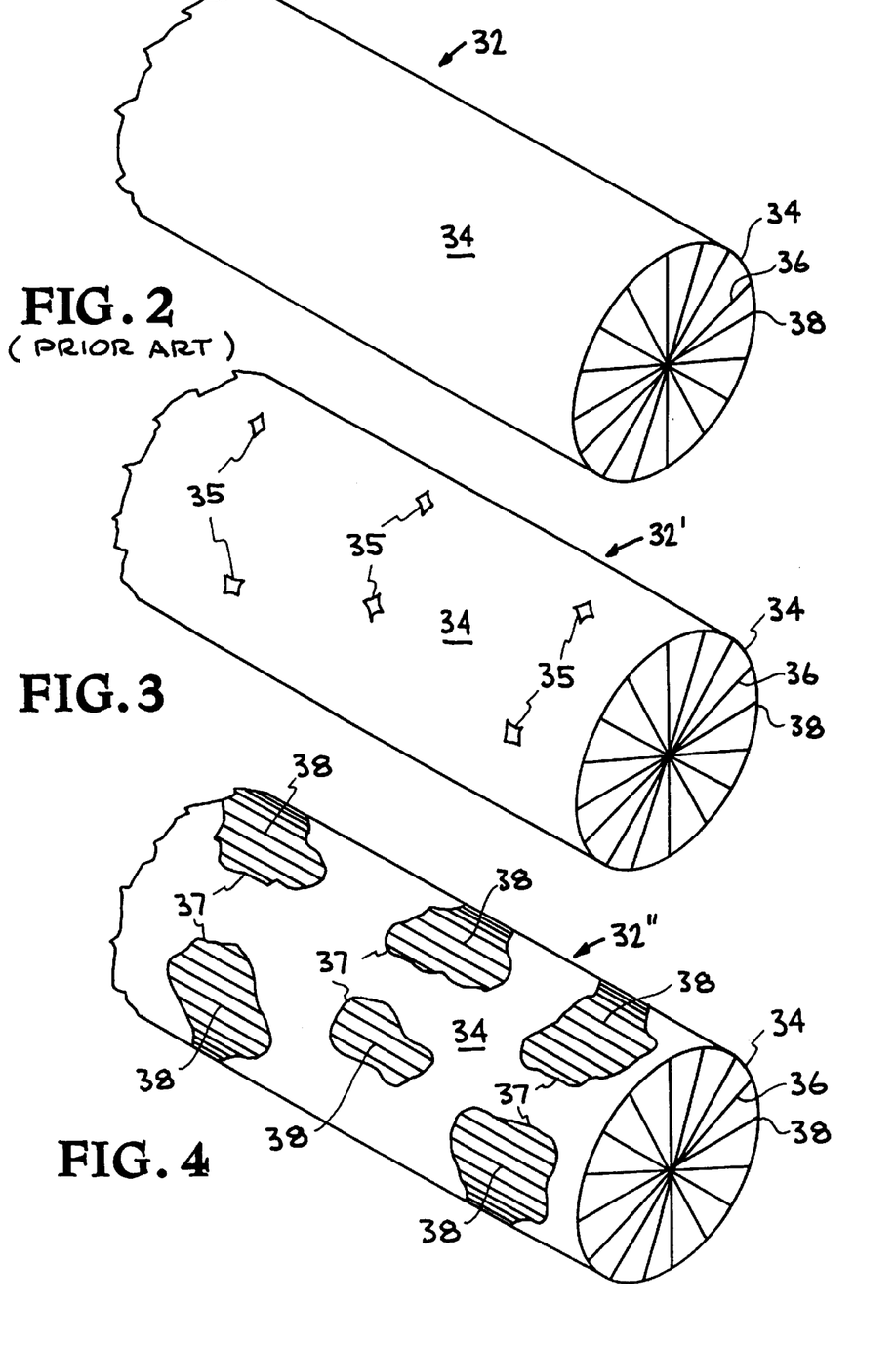
FIG. 2 is a partially cutaway isometric view of a prior art mesophase carbon fiber before application of the process of the invention thereto.
FIG. 3 is a partially cutaway isometric view of the mesophase carbon fiber of FIG. 2 after loading catalyst particles on the hard carbon surface of the carbon fiber, in accordance with the invention.
FIG. 4 is a partially cutaway isometric view of the mesophase carbon fiber of FIG. 3 after etching of the carbon fiber to selectively remove portions of the hard carbon shell adjacent the catalyst particles adhering to the carbon shell of the fiber in accordance with the invention.

FIG. 2 shows a typical mesophase fiber, at 32, before treatment in accordance with the invention, having graphite-like plates 36 with edges 38 thereon, and a hard carbon shell 34 surrounding plates 36 and edges 38 thereon. FIG. 3 shows the same mesophase fiber, at 32', after formation of catalyst sites 35 shown on the surface of hard carbon shell 34. It should be noted that while catalyst sites 35 are shown as several rather large (scale-wise) sites for illustrative purposes only, actually catalyst sites 35 will comprise a large number of very small sites, which will function as nucleation sites for the etching of the hard shell to form, in essence, a porous shell wherein a sufficient amount of the shell will remain to provide the desired physical integrity and strength to the fiber, while exposing a large area of edges 38 of graphite-like carbon plates 36 beneath hard carbon shell 34 to thereby provide a large number of active sites when the fiber, after being treated in accordance with the invention, is fabricated into an electrode.

d. Etching of Mesophase Fiber to Expose Edges of Graphite-Like Planes Beneath Hard Carbon Surface of Mesophase Fiber In accordance with the process of the invention, the mesophase carbon fiber, after having the desired catalyst sites formed on the surface of the hard carbon shell of the fiber in the previous step, is now subjected to an etching step to selectively remove a portion of the hard carbon shell of the fiber to thereby expose underlying edges 38. This is shown in FIG. 4 wherein mesophase fiber 32" is shown with portions of the surface of hard carbon shell 34 etched away, corresponding to the previous location of catalyst sites 35 in FIG. 3, leaving openings 37 in shell 34 wherein portions of the edges 38 of graphite-like plates 36 beneath shell 34 are exposed. These exposed edges 38 of graphite-like plates 36 then serve as potential active sites when the fiber, after being treated in accordance with the invention, is fabricated into an electrode. As commented upon above, with respect to FIG. 3, FIG. 4 (for illustrative purposes only) shows a few etched areas greatly exaggerated in size, it being understood that the etched fiber will actually be characterized by a number of very small etched away areas to, in essence, form a porous shell out of hard carbon shell 34. The etching process may be a simple heating of the fibers in a chamber in the presence of reacting gases, or using plasma, reactive ions, and/or other means to remove carbon around the catalysts on the surface of the carbon fibers.

The total amount or area of the hard carbon shell which will be removed by etching will depend upon the density of the catalyst sites formed on the hard carbon shell in the previous step as well as the residence time, temperature, and concentration of the etchant used to remove the hard carbon coating.

For the formation of a rechargeable electrode from the treated fiber, such as an anode in a lithium-ion cell, the percentage of the total area of the hard carbon shell which will be removed typically will vary from about 50% to about 80%. Because of the metal intercalation and solvent co-intercalation into the fiber and resulting exfoliation, which occurs with such applications, retention of at least some of the fiber skin is believed to be necessary. However, for other applications, such as for oxygen reduction and for supercapacitors, the whole skin may be removed to expose all of the edge sites because the reactions occur at the surface edge sites, with no bulk penetration apparently involved.

In some instances, for example, in low current applications, a much smaller percentage of the total surface area of the hard carbon shell may be removed (resulting in less active sites being formed on the exposed edges of the underlying graphite-like plates), i.e., as little as 10% of the shell area may be removed. In some instance, as little as 1% of the hard carbon shell area will be removed. However, for most applications, at least about 25% of the area of the hard carbon shell will be removed in this step. Preferably, when the fiber is to be used for the anode of a lithium-ion cell, the maximum amount should not exceed about 80% of the shell area to leave a sufficient amount of the hard carbon shell remaining to provide physical integrity and mechanical strength to the fiber.

The etchant used to selectively remove portions of the hard carbon shell, to expose the edges of the underlying graphite-like planes comprising the body of the fiber, may comprise a gaseous chemical etchant or a electrochemical etchant process such as a plasma or reactive ion etch process. The particular etchant selected should be one which will react with carbon at a reasonable temperature (preferably under 3000° C., and most preferably under 800° C.) to form a gaseous product which can be removed from the fiber, i.e., which will leave no residues on the mesophase fiber which could block or impede the desired access to the edges of the graphite-like planes within the fiber. Examples of gases or vapors which may be used as etchants include $O_2$, $H_2$, $H_2O$, $CO_2$, $NO_x$, $SO_2$, $F_2$, $Cl_2$, halocarbons such as fluorocarbons and chlorocarbons, and (in some cases) mixtures of same.

The particular choice of etchant used to selectively remove portions of the hard carbon shell where the catalyst sites were formed in the preceding step will also be dependent upon the type of catalyst present in the catalyst sites formed on the hard carbon shell in the previous step. For example, when a nickel catalyst is used to form the catalyst sites on the hard carbon shell of the fiber, hydrogen gas is preferably used as the etchant, while hydrogen or oxygen is used as the etchant when the catalyst sites are formed using a platinum catalyst. For oxide catalysts, oxygen is preferably used as the gaseous etchant, while either oxygen or carbon dioxide may be used as the etchant gas for metal salts or bases such as the alkali metal salts or bases and the alkaline earth metal salts or bases. $H_2O$ vapors may be used as the etchant gas when metals are used as the catalyst, $CO_2$ gas may be used as the etchant gas when metal salts are used as the catalyst, $NO_x$ gas may be used as the etchant gas when metals and metal oxides are used as the catalyst. Using oxygen as the etchant has been found to be particularly satisfactory when the treated mesophase carbon fiber is used in an electrode used for oxygen reduction.

As alluded to above, the temperature used during the etch step preferably ranges from ambient (i.e., about −100° C.) to about 3000° C., and most preferably from ambient to about 800° C. Thus, the reaction or contact time of the etchant with the hard carbon shell of the fiber will depend upon the particular catalyst used and the density of catalyst sites on the hard carbon shell of the fiber, as well as the reaction temperature and the desired percentage of area of the hard carbon shell to be removed during the etching step.

While the above description relates to the treatment of a previously formed mesophase carbon fiber, it should be noted that the above-described etch treatment could be incorporated in the fabrication process for making the mesophase carbon fiber. For example, the mesophase carbon fiber may be formed by first spinning the mesophase carbon fiber, e.g., at about 300° C.; then thermosetting the fiber, e.g., at about 220° C. in air; then carbonizing the fiber in nitrogen, e.g., at about 600° C. in nitrogen; and then graphitizing the fiber in nitrogen, e.g., at about 2800° C. to about 3000° C. in nitrogen. The above-described etch treatment of the fiber to remove at least a portion of the hard shell could be carried out at any time after the second formation step, i.e., after the thermosetting step.

Figure 5:
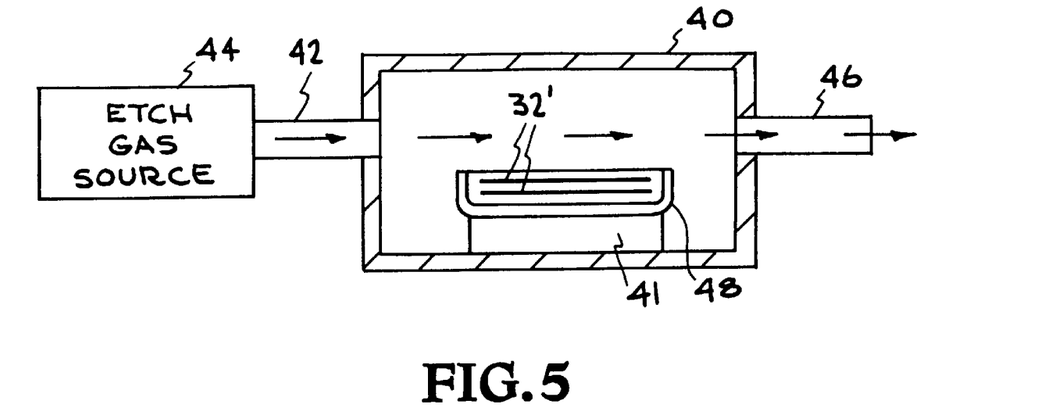
FIG. 5 is a vertical cross-sectional view of an apparatus which can be used for the step of selective etching the mesophase carbon fibers after the step of loading metal catalyst particles on the surface of the carbon shell of the fibers.
Figure 6:
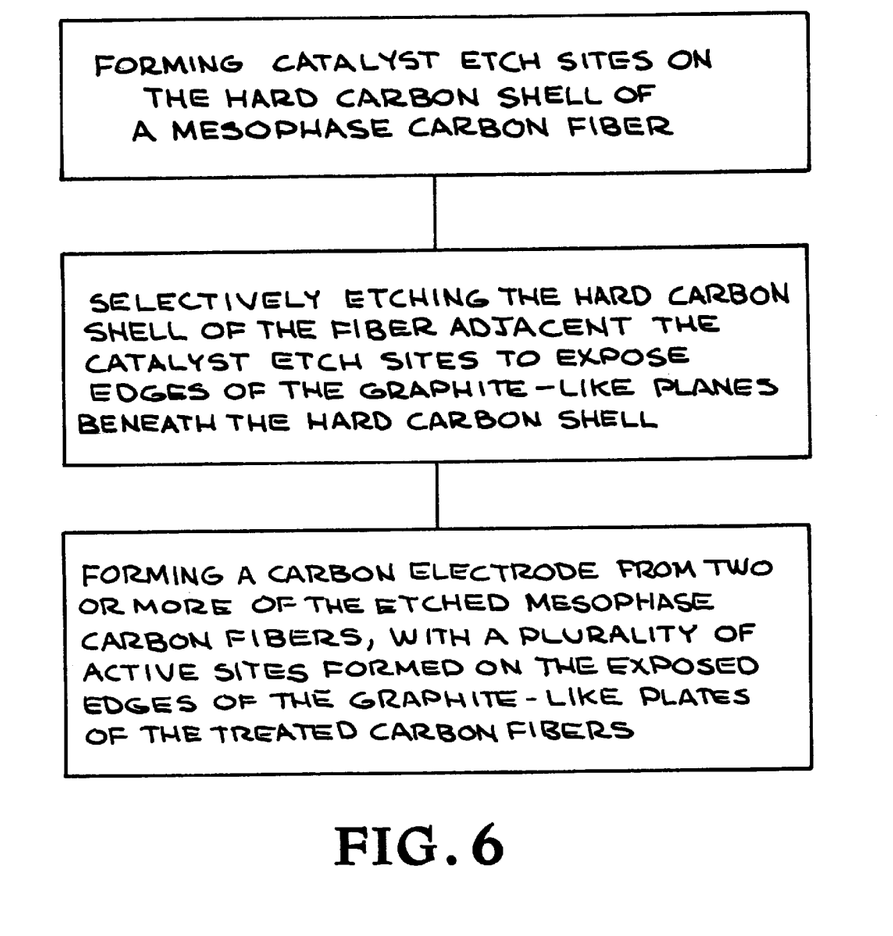
FIG. 6 is a flow sheet illustrating the process of the invention.

The etching step may be carried out, as illustrated in FIG. 5, by loading one or more of catalyst-loaded fibers 32' (i.e., mesophase fibers already having catalyst sites formed thereon in the previous step) into a boat 48, e.g., a ceramic boat, and placed on a pedestal 41 in an etch chamber 40 having an etch gas entrance port 42 connected to a source of etching gas 44. The etching gases, which may be preheated before entering etch gas chamber 40, pass over fibers 32' and then exit etch chamber 40 at an exit port 46. It will, of course, be recognized by those skilled in the art that the apparatus shown in FIG. 5 is only representative of one type of etch apparatus which may be used in accordance with the invention to carry out the etch step of the process of the invention and that other types of etching apparatus may be used instead.

Figure 7:
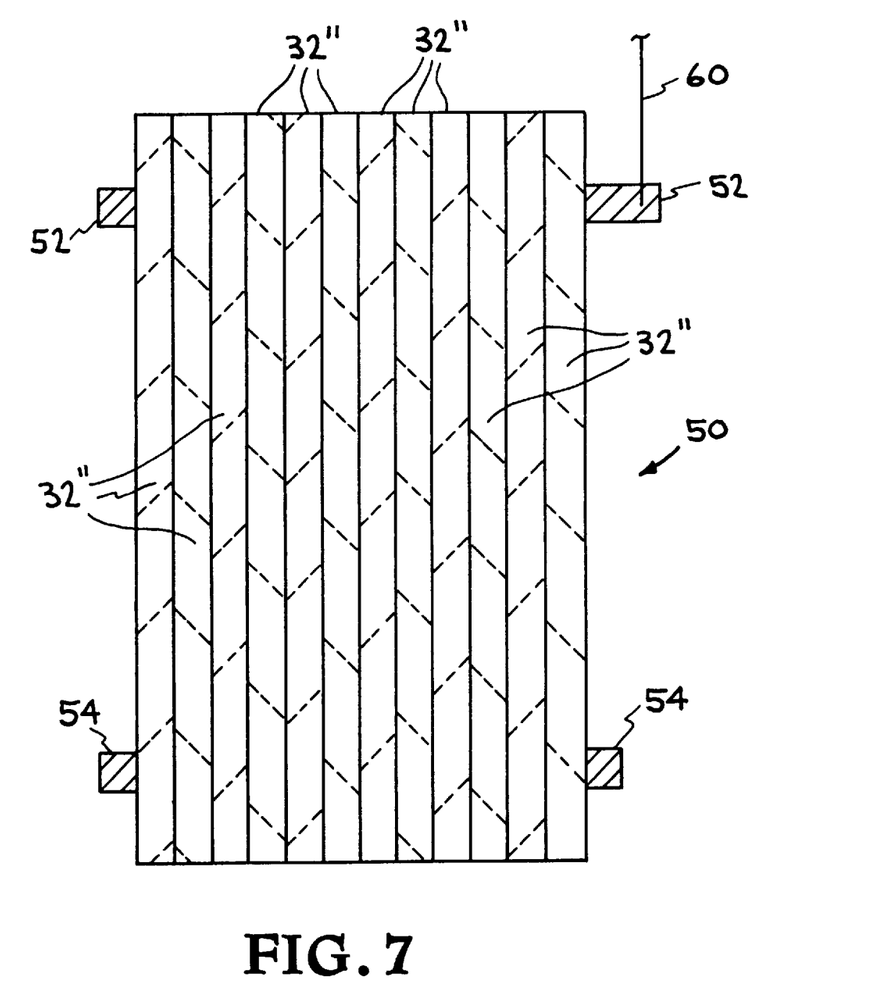
FIG. 7 is a vertical cross-sectional view of an electrode formed from a bundle of mesophase carbon fibers after being treated by the process of the invention.

After completion of the etching step, the etched fiber is removed from the etch chamber, optionally rinsed with deionized water and dried, and then is fabricated into an electrode. FIG. 7 shows a simplified version of an electrode comprising a plurality of mesophase fibers 32" processed in accordance with the invention and then bundled together to form an electrode 50 with a first metal band 52 placed around the bundle of fibers adjacent the top end thereof, with a wire 60 attached to first metal band 52 to provide for external electrical connection to electrode 50. A second optional metal band 54 may be placed around the bundle of fibers 32" adjacent the bottom of the bundle to assist in securing the processed fibers together. In such case, at least second metal band should preferably comprise a metal which will not react with any electrolyte with which it may come in contact during operation of electrode 50 in an electrolytic cell.

It will be understood that treated mesophase fibers 32" may be fabricated into various shapes, for example, by braiding the fibers into cords and/or by weaving such braided fibers into mats or other shapes. It will also be recognized that while the mesophase carbon fibers have been shown as elongated cylinders, they may comprise other extruded shapes of varying cross-section, and could even be extruded as sheets, e.g., flat sheets with, in each instance, an outer skin or cladding of the hard carbon shell material and inner graphite-like plates within the hard carbon shell having edges generally perpendicular to the surface of the hard carbon shell.

Example I

A group of mesophase carbon fibers, having an average diameter of 10 μm and covered with a hard carbon shell of approximately 20 nm average thickness, were first treated in a 0.1 molar aqueous solution of nickel acetate at room temperature by briefly dipping each fiber into the catalyst solution and then letting the fiber air dry. The catalyst-loaded fibers were then loaded into a quartz boat and placed in a 0.05 liter etching chamber and preheated in helium to 400° C. Air was flowed through the etching chamber at a rate of 50 cubic centimeters per minute (ccm) for a period of 60 minutes. The processed fibers were then removed from the etch chamber and examined under a scanning electron microscope (SEM). Irregular shaped openings in the hard carbon shells of the fibers, having areas ranging from about 100 $nm^2$ to about 1000 $nm^2$, were found to be uniformly formed over the entire area of the fiber surfaces, with edges of the underlying graphite plates of the fibers exposed by the etching.

Example II

A number of cylindrical carbon electrodes, each having a diameter of about 0.5 mm, a length of about 4.0 cm, and a weight of about 0.05 grams, were formed using a bundle of mesophase carbon fibers treated in Example I and bound together by a thin copper wire. Each carbon electrode, comprising the treated mesophase carbon fibers of the invention, was wrapped in a thin porous polypropylene film (Celgard 2400) which also functioned as a separator. Test cells were then assembled from these electrodes in a helium-filled glove box with low oxygen and moisture concentration. Each electrode was placed in a 0.8 cm diameter glass container with a lithium metal foil electrode with a 20 $\mu$m thick porous polypropylene film (Celgard 2400) placed in between the electrodes as a separator. The container was filled with 4.0 ml of an electrolyte comprising a 1.0M solution of $LiPF_6$ (lithium hexaflorophosphate) in a mixture of 30% by weight ethylene carbonate (EC) and 70% by weight diethylcarbonate (DEC). Control cells were also assembled in the same manner, except that untreated mesophase fibers were used for control 1, while control 2 constituted graphite powder mixed with 5–8% carbon black and 5–8% polyvinylidene fluoride (PVDF) and coated on a 1.0 mil copper foil.

Each cell was then tested to determine its irreversible capacity (in mAh/g), its reversible capacity (in mAh/g), and its final electrode capacity (in mAh/g). All the measurements were made using a constant current (50–100 mA/g) cycling with an Arbin multichannel cycler. The cells were cycled between 3 volts and 0.05 volts. After the completion of the first charge-discharge cycle, the irreversible and reversible capacities were obtained. The results are listed in Table I below. The type of fiber refers to the particular Amoco or DuPont designation for their various mesophase carbon fibers.

TABLE I

| Fiber Type | Irreversible Capacity (mAh/g) | Reversible Capacity (mAh/g) | Final Electrode Capacity (mAh/g) |
|---|---|---|---|
| P25 (Amoco) | 100 | 350 | * |
| P55 (Amoco) | 80 | 320 | * |
| P75 (Amoco) | 80 | 260 | * |
| P100 (Amoco) | 30 | 240–280 | 250 |
| P120 (Amoco) | 20 | 220–260 | 250 |
| P130 (Amoco) | 20 | 180–300 | 260 |
| E-130 (DuPont) | 30 | 170–240 | 220 |
| CONTROL 1 | 20–30 | 50–60 | 50–60 |
| CONTROL 2 | 30–50 | 250–350 | 100–150 |

*The large irreversible capacity loss of these electrodes, apparently due to their low crystallinity, makes them unsuitable for use in a rechargeable cell such as a lithium cell.

Figure 8:
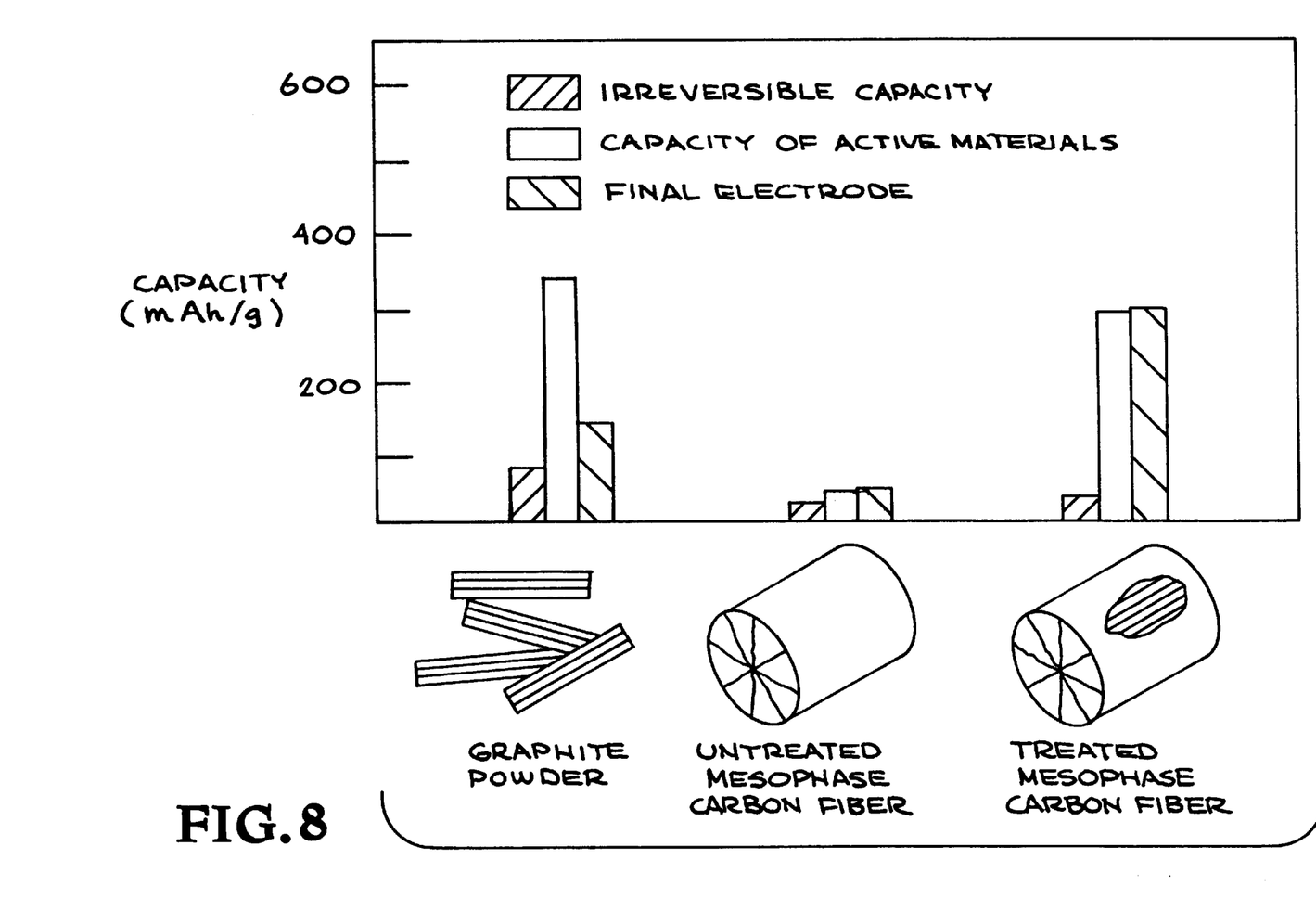
FIG. 8 is a graph showing the capacities, respectively, of electrodes made from regular graphite powder, untreated mesophase carbon fibers, and mesophase carbon fibers treated in accordance with the invention, when the electrode is used as the anode in a lithium-ion battery.

The graph of FIG. 8 shows the capacities, respectively, of electrodes made from mesophase carbon fibers treated in accordance with the invention, the electrode formed from untreated mesophase carbon fibers (control 1), and the graphite powder electrode (control 2).

Example III

To demonstrate the use of the treated mesophase carbon fibers of the invention as electrodes in an oxygen cell, electrodes similar to those described in Example II were formed, except that platinum wire was used to bundle the fibers together. Untreated fibers were also used to provide a control electrode. In each instance the carbon electrode was immersed in a 200 ml glass cell containing 150 ml of $O_2$ saturated 0.1M KOH and a gold counter electrode at 20° C. The voltage at which oxygen evolution commenced was measured, the oxygen reduction current for treated mesophase fibers was determined at –0.6 volts vs. the Hg/HgO reference electrode, and the ratio of oxygen reduction currents for treated and untreated mesophase fibers was determined at –0.6 volts vs. the Hg/HgO reference electrode. The results are shown below in Table II.

TABLE II

| Fiber Type | Onset Voltage for $O_2$ Reduction V vs. Hg/HgO | Ratio of $O_2$ Reduction Current of Treated vs. As-Received Fibers at –0.6 V vs. Hg/HgO | $O_2$ Reduction Current of Treated Fibers at –0.6 V vs. Hg/HgO |
|---|---|---|---|
| P55 | –0.2 | 2.5 | 800 |
| P75 | –0.2 | 50–100 | 1000 |
| P100 | –0.3 | 10–12 | 700 |
| P120 | –0.4 | 2–5 | 600 |
| P130 | –0.3 | 20 | 400 |
| E-130 | –0.3 | 4 | 200 |

Note the control equals column 4 divided by column 3.

Example IV

Carbon electrodes similar to those constructed in Example III were used to study the capacitance of electrodes made using mesophase carbon fibers (Amoco P-100) treated in accordance with the invention. As control electrodes, carbon electrodes were also constructed using, respectively, untreated mesophase carbon fibers, rayon carbon fibers from regenerated cellulose (DuPont), and polyacrylonitrile (PAN) based fibers (T-8000 from Toray) A standard H-shaped cell was used with one compartment containing an auxiliary platinum gauze electrode and the other compartment containing the carbon electrode. A saturated calomel electrode (SCE) in 1.0M $H_2SO_4$ was used for the test. All experiments were conducted at room temperature and using a helium purge to eliminate possible oxygen contamination in the electrolyte. An EG&G 271 potentiostat was used to collect the electrochemical data. Potential scan rates of 1 mV/s to 20 mV/s were used to obtain the cyclic voltammograms.

Figure 9:
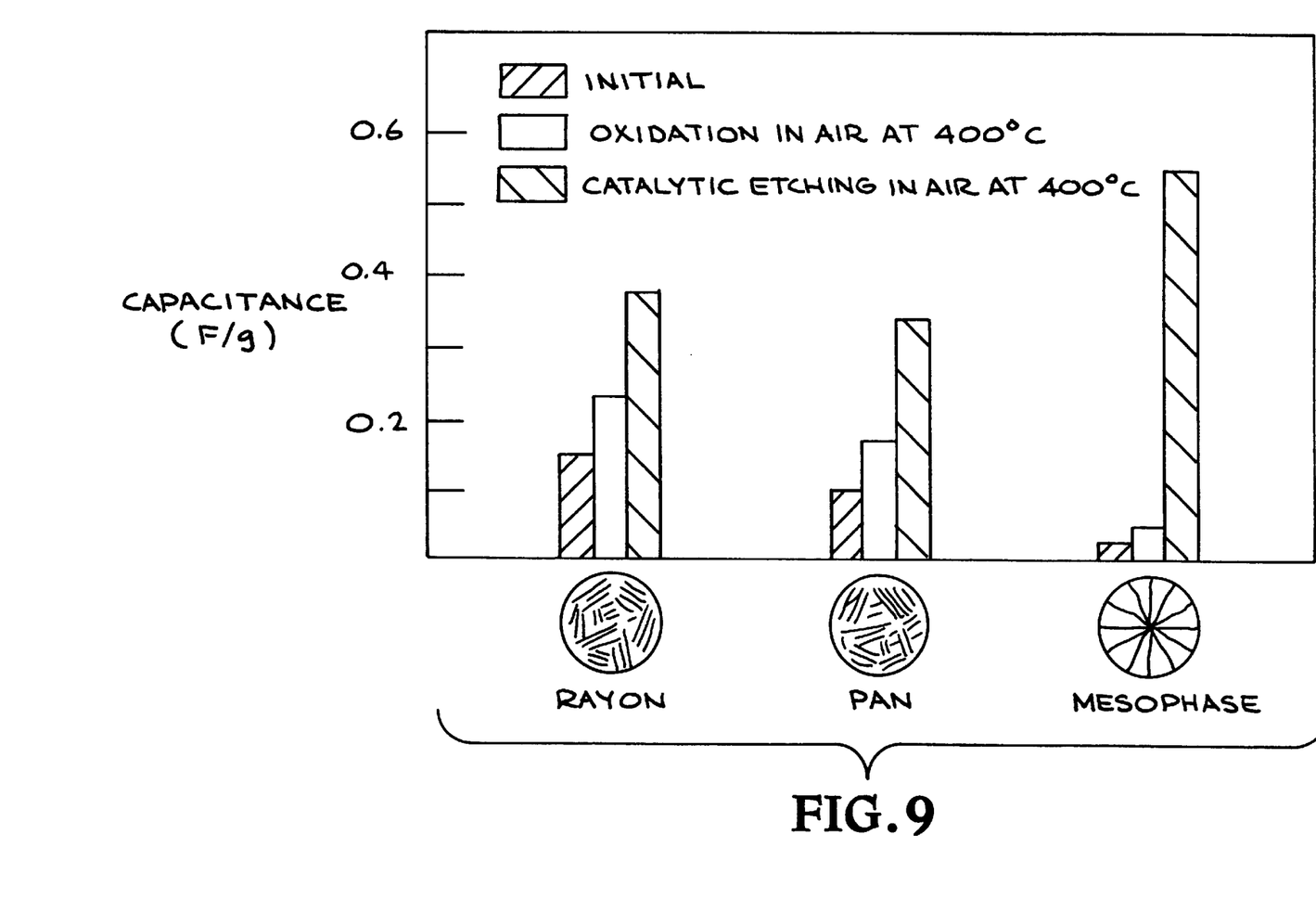
FIG. 9 is a graph showing the double-layered capacitance of electrodes made using the three respective types of carbon fibers in untreated and treated form.

FIG. 9 illustrates the double-layered capacitance of electrodes made using the three respective types of carbon fibers. The capacitances of the untreated rayon and PAN fibers are much higher than that of the untreated mesophase carbon fibers. After oxidation in air, the capacitance of the rayon and PAN fibers increased about 60% (from their initial capacitance), while the untreated mesophase fibers showed an increase of about 100% (from their initial capacitance). However, after treatment in accordance with the invention, the capacitance of the treated mesophase carbon fibers increase dramatically to as much as 20 times their original capacitance. When the rayon and PAN fibers were similarly treated, their capacitance doubled (from their initial capacitance), but was still less than the capacitance of the treated mesophase fibers.

Example V

Carbon electrodes similar to those constructed in Example III, containing respectively both untreated P75 mesophase carbon fibers and P75 mesophase carbon fibers treated in accordance with the invention were used to conduct redox tests using a gold counter electrode and an electrolyte comprising 5 mM of $K_4Fe(CN)_6$ in 1M KCl. Carbon electrodes made respectively from mesophase carbon fibers treated in accordance with the invention and untreated mesophase carbon fibers were tested. The carbon samples were held with a platinum wire current collector for electrochemical evaluation. A standard H-shaped cell was used with one compartment containing an auxiliary platinum gauze electrode and the other compartment containing the carbon electrode. All experiments were done at room temperature and a helium purge was used to eliminate possible oxygen contamination in the electrolyte. An EG&G 271 potentiostat was used to collect the electrochemical data. Potential scan rates of 1 mV/sec. to 20 mV/sec. were used to obtain the cyclic voltammograms.

Figure 10A:
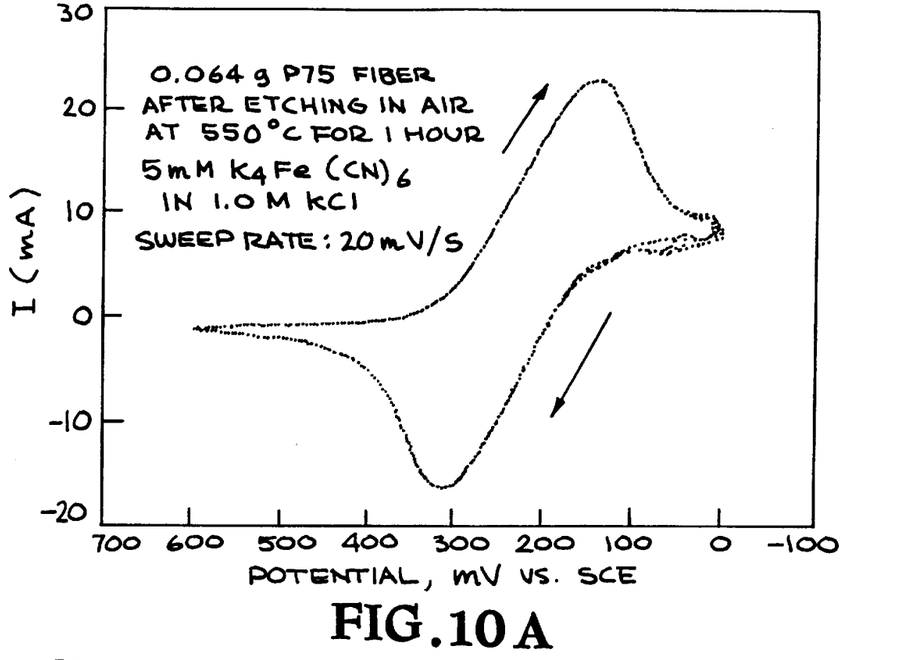
FIG. 10A is a graph showing the cyclic voltammogram results for an $Fe^{2+}/Fe^{3+}$ redox reaction when a carbon electrode is used which is formed from untreated P75 mesophase carbon fibers.
Figure 10B:
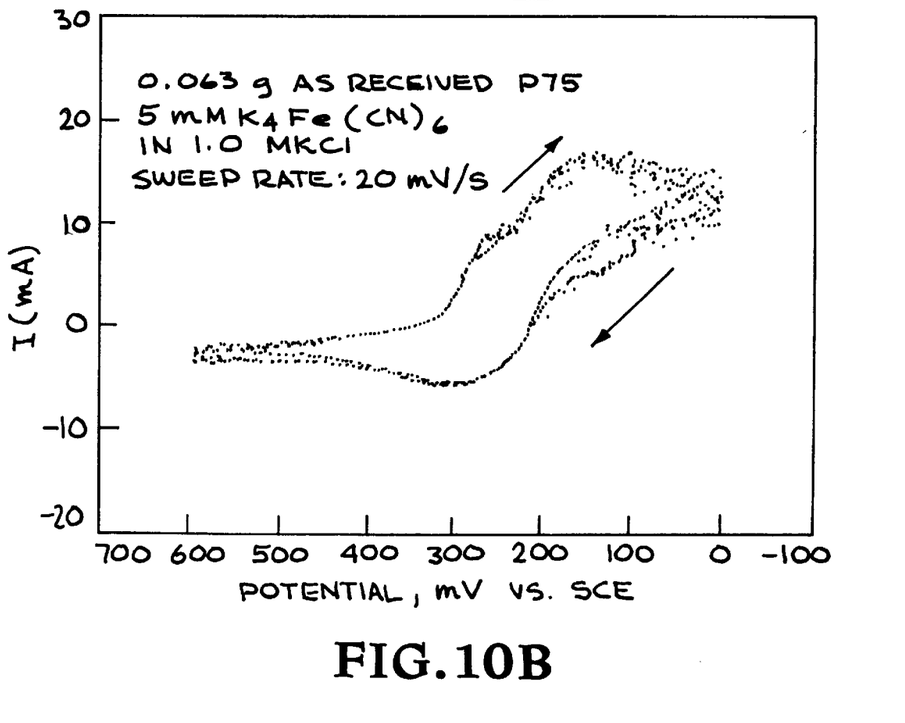
FIG. 10B is a graph showing the cyclic voltammogram results for an $Fe^{2+}/Fe^{3+}$ redox reaction when a carbon electrode is used made from P75 mesophase carbon fibers treated in accordance with the invention.

FIG. 10A shows the cyclic voltammogram results for a $Fe^{2+}/Fe^{3+}$ redox reaction when a carbon electrode is used which is made from P75 mesophase carbon fibers treated in accordance with the invention, while FIG. 10B shows the results for the same $Fe^{2+}/Fe^{3+}$ redox reaction when a carbon electrode is used which is formed from untreated P75 mesophase carbon fibers. The improvement in the oxidation/reduction peaks shown in FIG. 10A, representing the results of using an electrode having mesophase fibers treated in accordance with the invention, over those in FIG. 10B, representing the use of untreated fibers, illustrate the advantages of the invention.

Thus, the treated mesophase carbon fiber, and the process of making same of the invention, provide a carbon fiber having a high density of exposed edges capable of forming active sites in an electrode made from the treated carbon fibers of the invention. The resulting electrode of the invention exhibits high charge and discharge capacity while also providing good mechanical strength and low corrosion resistance and can be used successfully in a number of different types of electrochemical reactions.

Having thus described the invention what is claimed is:

1. A mesophase carbon fiber having a hard carbon shell thereon ranging in thickness from about 0.01 μm to about 0.1 μm, and treated to completely remove first portions of said hard carbon shell comprising from at least 1% to about 80% of the area of said hard carbon shell on said fiber to thereby expose sufficient edges of the underlying plates in said fiber to form from said mesophase carbon fiber a carbon electrode having a reversible electrode capacity of at least about 170 milliAmp hours per gram (mAh/g), with other portions of said hard carbon shell remaining on said fiber to impart physical strength and integrity to said mesophase carbon fiber.

2. The treated mesophase carbon fiber of claim 1 wherein said first portions of said hard carbon shell on said fiber are completely removed by first forming a plurality of catalyst sites on said first portions of said hard carbon shell to be completely removed.

3. The treated mesophase carbon fiber of claim 2 wherein said fiber is subjected to an etch which will completely remove only said first portions of said hard carbon shell beneath and adjacent said catalyst site.

4. The treated mesophase carbon fiber of claim 1 wherein from about 10% to about 80% of said area of said hard carbon shell on said mesophase fiber is completely removed to thereby expose said edges of said underlying plates in said mesophase fiber beneath said removed area of said hard carbon shell while the remainder of said hard carbon shell is retained on said mesophase fiber.

5. The treated mesophase carbon fiber of claim 1 wherein from about 25% to about 80% of said area of said hard carbon shell on said mesophase fiber is completely removed to thereby expose said edges of said underlying plates in said mesophase fiber beneath said removed area of said hard carbon shell while the remainder of said hard carbon shell is retained on said mesophase fiber.

6. The treated mesophase carbon fiber of claim 1 wherein from about 50% to about 80% of said area of said hard carbon shell on said mesophase fiber is completely removed to thereby expose said edges of said underlying plates in said mesophase fiber beneath said removed area of said hard carbon shell while the remainder of said hard carbon shell is retained on said mesophase fiber.

7. A carbon structure comprising carbon plates radially disposed in said structure from the center of said structure to provide edges of said plates terminating perpendicular to the sidewalls of the structure, and having a hard carbon shell over the structure ranging in thickness from about 0.01 μm to about 0.1 μm, with portions of said hard carbon shell ranging in area from at least 10% to about 80% completely removed to expose sufficient of said edges of said radially disposed plates underlying said carbon shell to attain a reversible electrode capacity of at least about 170 milliAmp hours per gram (mAh/g).

8. A mesophase carbon fiber having, on first portions of a surface of said mesophase carbon fiber, exposed edges of underlying sheets in said mesophase carbon fiber, and a hard carbon shell on second portions of said surface ranging in thickness from about 0.01 μm to about 0.1 μm, and comprising from about 25% to about 80% of the total area of said mesophase carbon fiber, said exposed edges sufficient to form, from said mesophase carbon fiber, a carbon electrode having a reversible electrode capacity of at least about 170 millAmp hours per gram (mAh/g).

9. The mesophase carbon fiber of claim 8 wherein said mesophase carbon fiber comprises a carbon electrode having a plurality of active sites thereon formed by said exposed edges of said underlying sheets in said mesophase carbon fiber.

10. A mesophase carbon fiber structure having a hard carbon shell ranging in thickness from about 0.01 μm to about 0.1 μm on first portions of a surface of said mesophase carbon fiber, and sufficient exposed edges of underlying sheets of said mesophase carbon fiber on second portions of said surface of said mesophase carbon fiber to form, from said mesophase carbon fiber structure, a carbon electrode having a reversible electrode capacity of at least about 170 milliAmp hours per gram (mAh/g), said mesophase carbon fiber structure formed by:

a) providing a mesophase carbon fiber having its entire surface covered by said hard carbon shell which thereby initially covers said exposed edges of said underlying sheets;

b) forming catalyst sites on said hard carbon shell of said fiber; and c) selectively etching portions comprising from about 50% to about 80% of the surface area of said hard carbon shell adjacent and beneath said catalyst sites to completely remove said portions of said hard carbon shell to thereby expose said edges of said underlying sheets in said fiber in those portions of said surface of said mesophase fiber where said hard carbon shell has been removed.

11. A mesophase carbon fiber comprising plates arranged radially around the axis of said fiber to radiate from said axis to a surface of said mesophase fiber and terminate in end edges at said surface of said mesophase fiber, from about 20% to about 75% of the surface area of said mesophase fiber having a hard carbon shell thereon ranging in thickness from about 0.01 $\mu$m to about 0.1 $\mu$m while other portions of said surface of said mesophase fiber have sufficient of said end edges of said plates exposed to form, from said mesophase carbon fiber, a carbon electrode having a reversible capacity of at least about 170 milliAmp hours per gram (mAh/g).

\* \* \* \* \*